(12) United States Patent
Hainsworth et al.

(10) Patent No.: US 10,745,257 B2
(45) Date of Patent: Aug. 18, 2020

(54) CABLE GUIDE MECHANISM FOR A RESCUE HOIST

(71) Applicant: Sikorsky Aircraft Corporation, Stratford, CT (US)

(72) Inventors: Barton J. Hainsworth, Oxford, CT (US); Peter J. Barner, Hamden, CT (US); Rohan M. McGregor, Stamford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 0 days.

(21) Appl. No.: 15/906,832

(22) Filed: Feb. 27, 2018

(65) Prior Publication Data
US 2019/0263642 A1   Aug. 29, 2019

(51) Int. Cl.
*B66D 3/26* (2006.01)
*B64D 1/22* (2006.01)
*B66D 1/36* (2006.01)

(52) U.S. Cl.
CPC ............. *B66D 3/26* (2013.01); *B64D 1/22* (2013.01); *B66D 1/36* (2013.01); *B66D 1/365* (2013.01)

(58) Field of Classification Search
CPC ............. B66D 3/26; B66D 1/365; B64D 1/22
See application file for complete search history.

(56) References Cited

U.S. PATENT DOCUMENTS

| | | | | | |
|---|---|---|---|---|---|
| 2,437,619 | A | * | 3/1948 | Setz | B64D 1/22 258/1.2 |
| 2,623,732 | A | * | 12/1952 | Morgan | B66D 3/04 188/64 |
| 3,088,608 | A | * | 5/1963 | Theodore | B60P 1/5414 212/75 |
| 3,228,044 | A | * | 1/1966 | Mattenson | B63C 9/26 441/83 |
| 3,478,904 | A | * | 11/1969 | Courter | B64C 1/22 187/242 |
| 4,170,341 | A | * | 10/1979 | Jacobson | B64D 1/22 244/137.1 |
| 4,188,000 | A | * | 2/1980 | Dalziel | B64D 1/22 182/138 |
| 4,267,987 | A | * | 5/1981 | McDonnell | B64D 39/00 244/137.4 |
| 4,598,882 | A | * | 7/1986 | Opdahl | B64D 3/02 114/253 |

(Continued)

FOREIGN PATENT DOCUMENTS

| | | |
|---|---|---|
| CH | 255198 A | 6/1948 |
| GB | 871073 A | 6/1961 |
| GB | 2303837 A | 3/1997 |

OTHER PUBLICATIONS

Extended European Search Report; European Application No. 19159455.5; dated Jul. 19, 2019; 7 pages.

*Primary Examiner* — Michael E Gallion
(74) *Attorney, Agent, or Firm* — Cantor Colburn LLP

(57) ABSTRACT

A hoisting system for hoisting a load relative to a body includes a hoisting cable, a hoisting mechanism selectively operable to deploy and retract the hoisting cable, and a guide mechanism movably mounted to the body at a position between the body and the hoisting cable. The guide mechanism includes at least one locking device that selectively locks the guide mechanism against movement in a first direction.

17 Claims, 4 Drawing Sheets

(56) References Cited

U.S. PATENT DOCUMENTS

| | | | | |
|---|---|---|---|---|
| 5,020,742 | A * | 6/1991 | Haslim | B64D 1/22 244/137.2 |
| 5,190,250 | A * | 3/1993 | DeLong | B64D 1/22 244/118.1 |
| 5,762,297 | A * | 6/1998 | Ascherin | B64D 1/22 244/137.1 |
| 6,698,723 | B1 * | 3/2004 | Antonini | B60P 7/083 254/391 |
| 6,708,926 | B2 * | 3/2004 | Bonisch | B64C 1/22 244/1 TD |
| 7,909,308 | B2 * | 3/2011 | Lauder | B64C 27/10 242/603 |
| 8,567,710 | B2 | 10/2013 | Hayashi | |
| 2003/0222177 | A1 * | 12/2003 | Bonisch | B64C 1/22 244/137.1 |
| 2012/0104152 | A1 * | 5/2012 | Figoureux | B64D 1/22 244/17.11 |

* cited by examiner

CABLE GUIDE MECHANISM FOR A RESCUE HOIST

BACKGROUND

Exemplary embodiments pertain to a hoisting system, and more particularly, to a deflector or guide for minimizing damage during operation of a hoisting system.

Rescue hoists, such as used on a helicopter for example, typically include a lifting device, such as a hoist or winch, a hoist cable deployed and retrieved by the hoist, and an attachment located at the end of the cable for coupling to a person or cargo. The hoist is commonly a rotary drum, and the hoisting cable is wound or unwound about the drum to raise and lower the hoisting cable and/or a load attached thereto.

Modern rescue hoists are typically operable at high speeds and have an extended length of usable cable. Particularly during high speed operation, as the hoist cable is lifted with a load attached, the load may begin to oscillate as it approaches the helicopter. With this movement, the hoist cable may hear against a surface of the helicopter, such as the door sill for example. This contact between the hoist cable and the airframe may result in damage to the cable.

BRIEF DESCRIPTION

According to an embodiment, disclosed is a hoisting system for hoisting a load relative to a body includes a hoisting cable, a hoisting mechanism selectively operable to deploy and retract the hoisting cable, and a guide mechanism movably mounted to the body at a position between the body and the hoisting cable. The guide mechanism includes at least one locking device that selectively locks the guide mechanism against movement in a first direction.

In addition to one or more of the features described above, or as an alternative, in further embodiments the guide mechanism is freely movable in a second direction, opposite the first direction.

In addition to one or more of the features described above, or as an alternative, in further embodiments the guide mechanism further comprises a roller, the roller being mounted to the body for rotation about a roller axis.

In addition to one or more of the features described above, or as an alternative, in further embodiments the roller is an elongated cylinder.

In addition to one or more of the features described above, or as an alternative, in further embodiments the at least one locking device locks rotation of the roller resulting from deployment of the hoisting cable.

In addition to one or more of the features described above, or as an alternative, in further embodiments the roller is rotatable about the roller axis during retraction of the hoisting cable.

In addition to one or more of the features described above, or as an alternative, in further embodiments the at least one locking device locks rotation of the roller in a counterclockwise direction.

In addition to one or more of the features described above, or as an alternative, in further embodiments the roller is freely rotatable about the roller axis in a clockwise direction.

In addition to one or more of the features described above, or as an alternative, in further embodiments the hoisting mechanism is rotatable about an axis to deploy and retract the hoisting cable.

In addition to one or more of the features described above, or as an alternative, in further embodiments the roller axis and the axis of the hoisting mechanism are parallel.

In addition to one or more of the features described above, or as an alternative, in further embodiments the guide mechanism further comprises an intermediate roller guide including one or more bearing surface arranged in contact with the roller.

In addition to one or more of the features described above, or as an alternative, in further embodiments the at least one locking device includes a pawl and ratchet mechanism.

In addition to one or more of the features described above, or as an alternative, in further embodiments the at least one locking device is positioned adjacent an end of the guide mechanism.

In addition to one or more of the features described above, or as an alternative, in further embodiments when the hoisting cable hangs vertically from the hoisting mechanism, the hoisting cable is not in contact with the guide mechanism.

In addition to one or more of the features described above, or as an alternative, in further embodiments the hoisting system is part of an aircraft.

In addition to one or more of the features described above, or as an alternative, in further embodiments the hoisting mechanism is mounted to a position offset from a surface of an airframe of the aircraft.

In addition to one or more of the features described above, or as an alternative, in further embodiments the body is an airframe of the aircraft and the guide mechanism is mounted to the airframe adjacent an opening formed in the airframe.

In addition to one or more of the features described above, or as an alternative, in further embodiments the guide mechanism is positioned directly underneath the opening formed in the airframe.

In addition to one or more of the features described above, or as an alternative, in further embodiments a length of the guide mechanism is at least equal to a length of the opening formed in the airframe.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
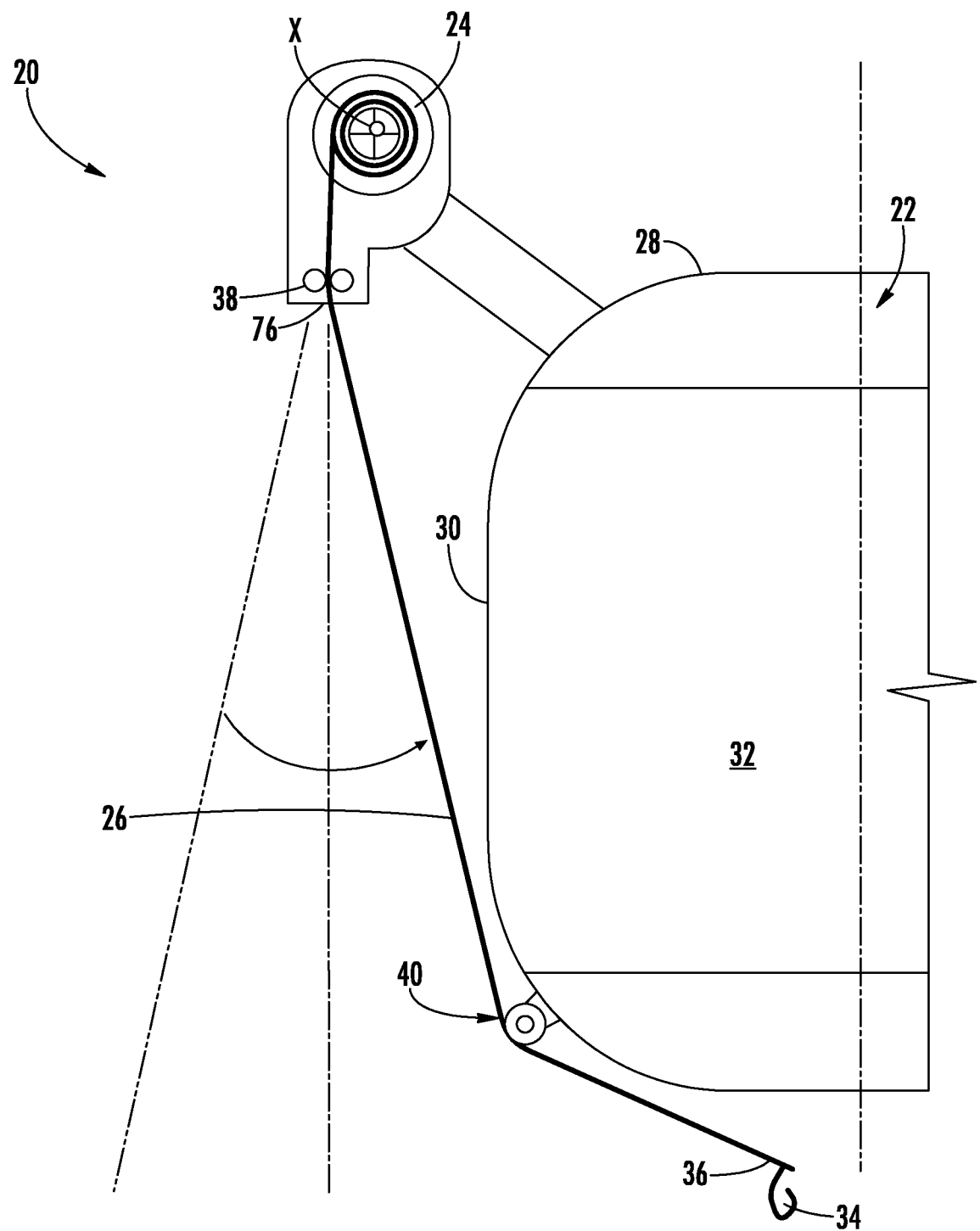
FIG. 1 is a schematic diagram of a hoisting system of an aircraft according to an embodiment.

Referring now to FIG. 1, an example of a hoisting system 20 is illustrated. In the illustrated, non-limiting embodiment, the hoisting system 20 is mounted to an aircraft 22, such as a helicopter for example, and may be used to lift and lower cargo, or during search and rescue missions. The hoisting system 20 includes a hoisting mechanism 24 and a hoisting cable 26 driven by the hoisting mechanism 24. In aerospace applications, the hoisting system 20 may be directly or indirectly coupled to an upper portion of an airframe 28 of an aircraft 22. As shown, the hoisting mechanism 24 may be offset from the surface of the airframe 28, such as at a position vertically above a door or opening 30 formed in the airframe 28, such that a load lifted by the hoisting system 20 may be raised to a position aligned with the opening 30 for receipt into the cabin 32 of the aircraft 22. In an embodiment, the hoisting mechanism 24 includes a generally cylindrical drum or winch rotatable about an axis by a motor (not shown) in both a first direction and a second, opposite direction. Although a rotating drum is illustrated and described herein, it should be understood that any suitable hoisting mechanism 24 is contemplated herein.

In an embodiment, the hoisting cable 26 of the hoisting system 20 is a wire rope including one or more strands wound together. The one or more strands may be individual strands, or alternatively, may also include a plurality of wires wound together for added strength. However, it should be understood that a hoisting cable 26 having any suitable construction is within the scope of the disclosure. A first end (not shown) of the cable 26 is anchored to the hoisting mechanism 24 and an attachment 34, such as a lifting hook for example, is coupled to a second end 36 of the cable 26. The attachment 34 is used to couple a load to the cable 26. In the illustrated, non-limiting embodiment, the hoisting cable 26 is wound about the outer surface of the hoisting mechanism 24 drum, such that rotation of the drum about its axis X in the first direction is configured to deploy a desired length of the hoisting cable 26, and rotation of the drum about axis X in a second direction is configured to retract a desired length of the hoisting cable 26. Accordingly, when the attachment 34 is coupled to a load, the hoisting mechanism 24 is used to lift the load via the hoisting cable 26.

By locating the hoisting mechanism 24 at a position offset from the airframe 28, the point at which the hoisting cable 26 separates from the hoisting mechanism 24, also referred to herein as the payout location 76, is also located offset from the airframe 28. As a result, the cable 26 is able to hang vertically without interference with the airframe 28. In some embodiments, the hoisting system 20 may additionally include one or more cable guides 38, for example located at a position separate from the hoisting mechanism 24, and near the payout location 76. The at least one cable guide 38 locally restricts oscillation of a portion of the hoisting cable 26 as the cable 26 is being deployed or retracted relative to the hoisting mechanism 24.

When a load is secured to the attachment 34 at the second end 36 of the hoisting cable 26, the hoisting cable 26 may experience side loads, such as due to rotation or shifting of the load or wind forces for example. To prevent the hoisting cable 26 from oscillating or swaying into contact with the airframe 28, a guide roller mechanism 40 is mounted to and protrudes outwardly from the side of the airframe 28 at a position adjacent the opening 30. In the illustrated, non-limiting embodiment, and best shown in FIG. 2, the guide roller mechanism 40 is located directly below the opening 30; however, in other embodiments, and depending on the configuration and contour of the airframe 28, the guide roller mechanism 40 may be mounted to the airframe 28 at a position spaced further from the opening 30.

Figure 2:
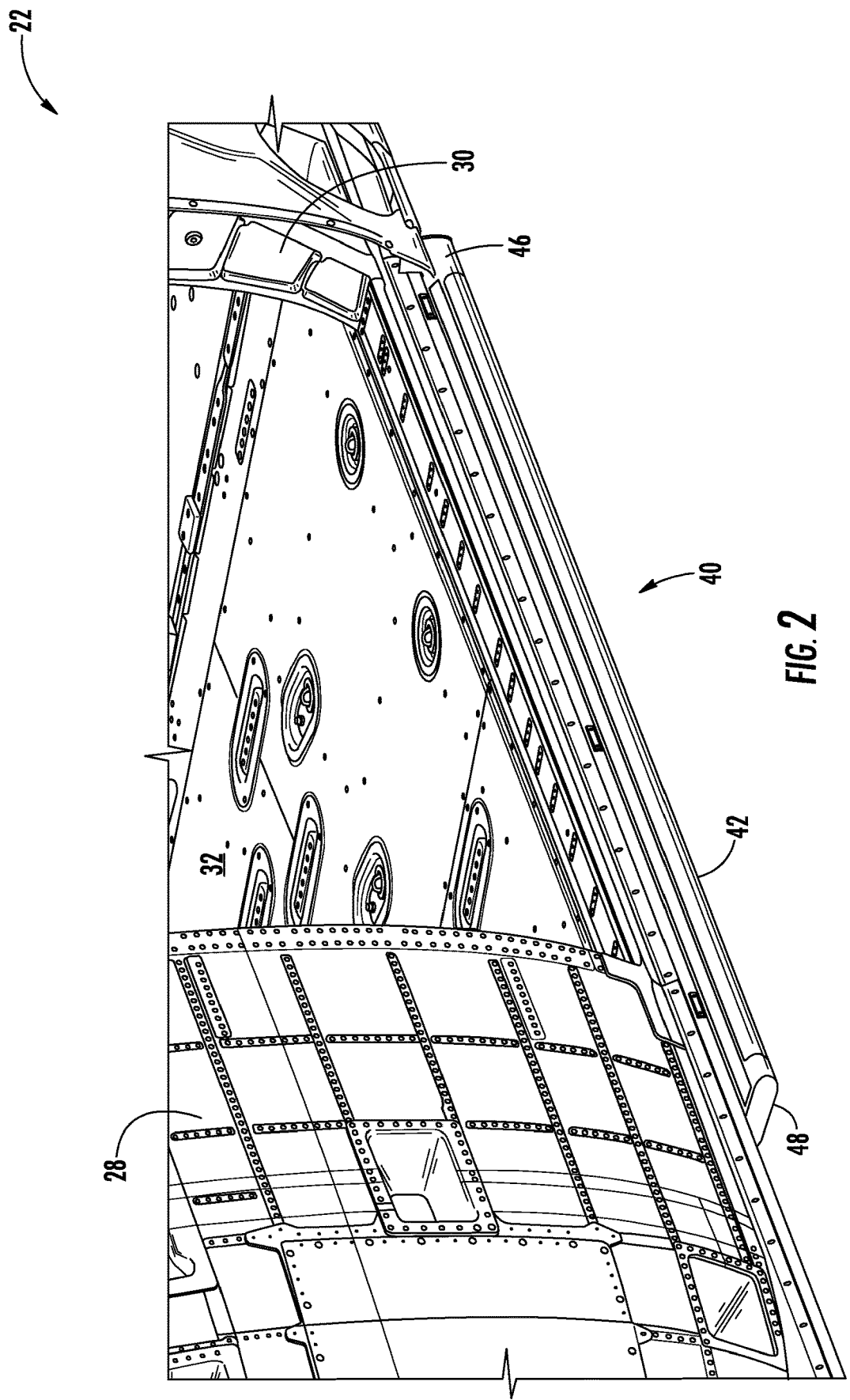
FIG. 2 is a perspective view of a guide roller mechanism of a hoisting system according to an embodiment.
Figure 3:
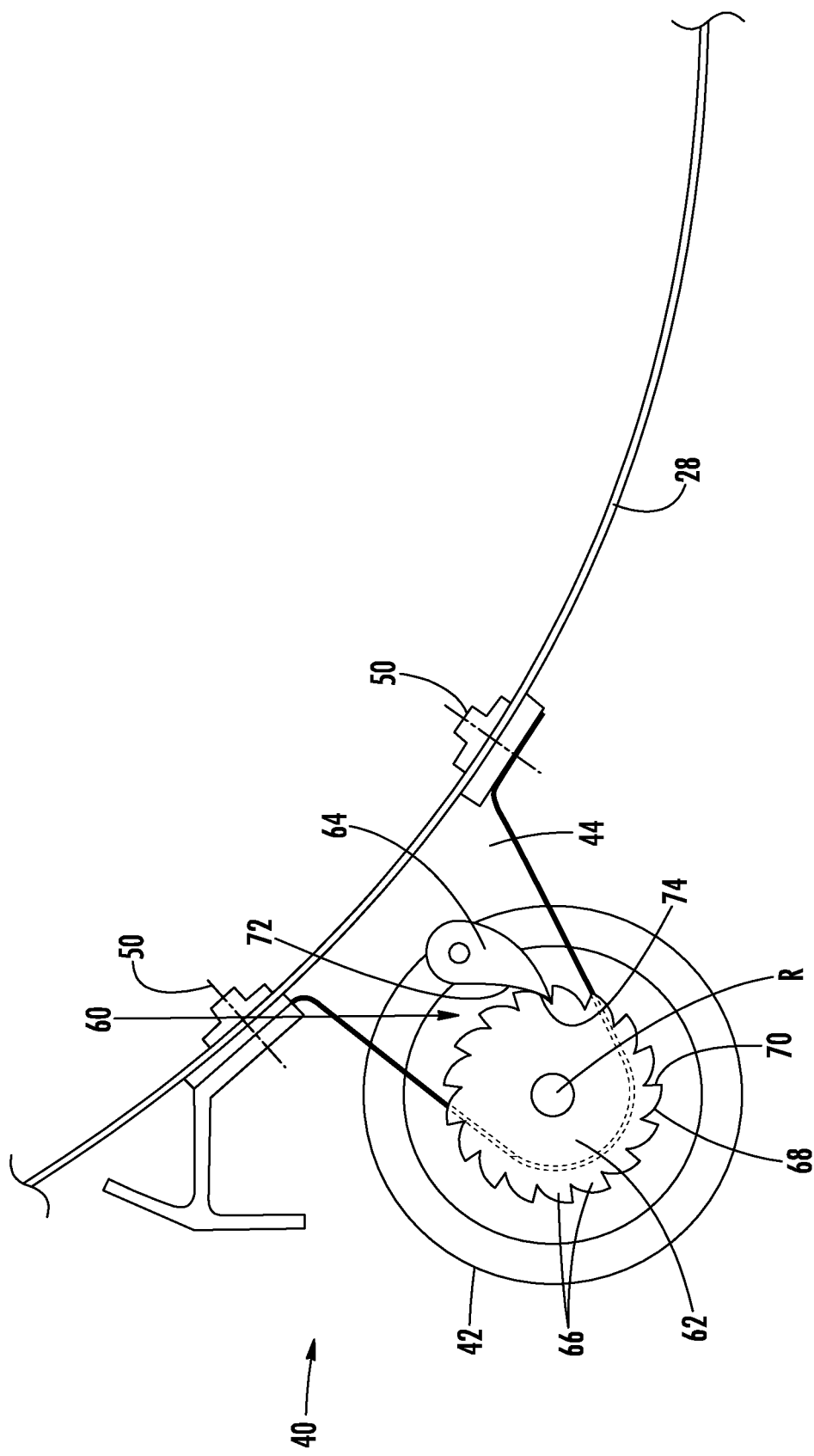
FIG. 3 is an end view of a guide roller mechanism of a hoisting system according to an embodiment.
Figure 4:
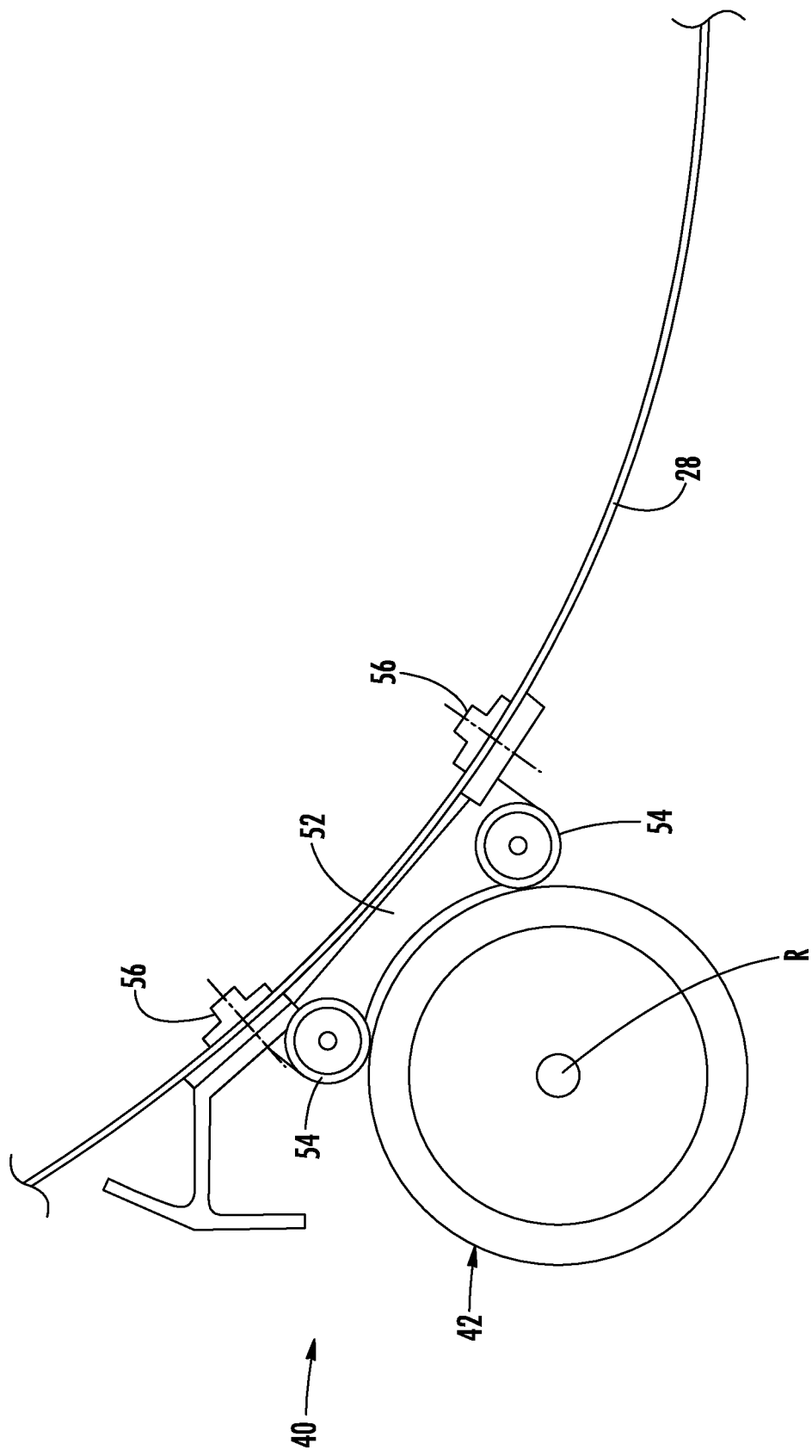
FIG. 4 is a cross-sectional view of a guide roller mechanism of a hoisting system according to an embodiment.

With reference now to FIGS. 2-4, the guide roller mechanism 40 is illustrated in more detail. The guide roller mechanism 40 includes a cylindrical roller or guide wheel 42 rotatable about a roller axis R relative to the airframe 28. The roller axis R and the axis X of the hoisting mechanism 24 may, but need not be parallel to one another. In an embodiment, the roller 42 may be an elongated cylinder having a length equal to or greater than the opening or doorway 30 formed in the airframe 28 (see FIG. 2). However, embodiments where the length of the roller 42 is shorter than the opening 30 are also contemplated herein. In an embodiment, the diameter of the roller 42 is greater than the minimum bend radius of the hoisting cable 26 to prevent damage to the hoisting cable 26 as the hoisting cable 26 engages the roller 42. In addition, the roller 42 may be formed from any suitable material, such as an extruded aluminum or titanium for example. In embodiments where the roller 42 is positioned generally beneath the opening 30 formed in the airframe 28, the roller 42 and the mounting is designed to support the weight of an occupant of the aircraft 22 without the occurrence of plastic deformation.

The roller 42 may be mounted to the airframe 28 via any suitable mechanism, including but not limited to, one or more mounting brackets 44. The mounting brackets 44 may be located adjacent the ends 46, 48 of the roller 42, or alternatively, may be spaced over the length of the roller 42, and may be affixed to the airframe 28 with one or more fasteners 50, as best shown in FIG. 3. In an embodiment, one or more intermediate roller guides 52 having one or more bearing surfaces 54 may be positioned between the roller 42 and the airframe 28. The engagement between the roller 42 and the intermediate roller guides 52 may facilitate an even rotation of the roller 42 over its entire length. In such embodiments, the intermediate roller guides 52 may be mounted to the exterior surface of the airframe 28, such as with one or more fasteners 56 for example.

With reference again to FIG. 3, the roller guide mechanism 40 additionally includes at least one locking mechanism 60. Although the at least one locking mechanism 60 is shown positioned adjacent an end 46 of the roller 42, it should be understood that the one or more locking mechanisms 60 may be arranged at any position about the roller 42. In the illustrated, non-limiting embodiment, the locking mechanism 60 includes a ratchet gear or spline 62 coupled to the roller 42 and a pawl 64, such as pivotally coupled to the mounting brackets 44 for example. The gear 62 and pawl 64 cooperate to allow the roller 42 to rotate in only one direction about the axis R. A biasing force of a biasing mechanism (not shown) coupled to the pawl 64 biases the pawl 64 into engagement with the teeth 66 of the gear 62. The plurality of the gear teeth 66 are substantially uniform, but have an asymmetrical contour including a first tooth surface 68 and a second tooth surface 70.

During rotation of the roller 42, and therefore the gear 62, in a first direction about the roller axis R, a first surface 72 of the pawl 64 is configured to contact the first tooth surface 68 of the plurality of gear teeth 66. As the slope of the first tooth surface 68 contacts the pawl 64, the first tooth surface 68 opposes the biasing force of the biasing mechanism, thereby causing the pawl 64 to slide over the first tooth surface 68 before being biased back to a neutral position between adjacent gear teeth 66. When the roller 42, and therefore the gear 62, is rotated in a second, opposite direction about the axis R, a second surface 74 of the pawl 64 will engage and catch against the steeper slope of the second tooth surface 70 of the first gear tooth 66 it encounters. The second pawl surface 70 will lock against the second tooth surface 74 to restrict motion of the gear 62, and therefore the roller 42, in the second direction. The pawl and ratchet locking mechanism 60 illustrated and described herein is intended as an example only, and any mechanism suitable to restrict rotation of the roller 42 in one direction is within the scope of the disclosure.

During operation of the hoisting system 20, the hoisting cable 26 typically only contacts the guide roller mechanism 40 when the hoisting cable 26 is oscillating or swaying relative to the hoisting mechanism 24. This oscillation of the hoisting cable 26 into contact with the guide roller mechanism 40 typically drives rotation of the roller 42. However, because the rotation of the roller 42 is allowed in only one direction, whether the roller 42 rotates about its axis R will depend on the direction of movement of the hoisting cable 26 relative to the hoisting mechanism 24. In an embodiment, the roller 42 does not rotate about its axis R when in contact with the oscillating hoisting cable 26 during deployment of the hoisting cable 26. Accordingly, the locking mechanism 60 is configured to restrict rotation of the roller about the roller axis R in a counterclockwise direction. If the hoisting cable 26 oscillates into contact with the roller 42 during retraction however, the roller 42 will rotate in a clockwise direction to facilitate the feeding of the hoisting cable 26 back to the hoisting mechanism 24. Although counterclockwise rotation of the roller is associated with deployment and clockwise rotation is associated with retraction, it should be understood that in other embodiments, clockwise rotation of the roller 42 may be associated with deployment and counterclockwise rotation may be associated with retraction of the hoisting cable 26.

Inclusion of the guide roller mechanism 40 as described herein prevents damage of an oscillating hoisting cable 26 resulting from contact with a surface of the airframe 28. In addition, the guide roller mechanism 40 reduces the likelihood of injury when a person or load is placed on the guide roller mechanism 40 during a hoisting operation. Although the hoisting system 20 is illustrated and described with respect to an aircraft 22, such as a helicopter, it should be understood that the hoisting system 20 may be adapted for use in other applications including but not limited to crane applications, such as used during construction or on naval vessels for example. In such embodiments, the guide roller mechanism 40 may be mounted to a side of a structure with which the crane is associated.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An aircraft comprising:
    an airframe having an opening in communication with a cabin;
    a hoisting system for hoisting a load relative to the airframe, the hoisting system including:
        a hoisting cable;
        a hoisting mechanism mounted to an exterior of the airframe selectively operable to deploy and retract the hoisting cable;
        a guide mechanism mounted to the exterior of the airframe directly underneath the opening, the guide mechanism being located remote from the hoisting mechanism and being rotatable about an axis relative to the airframe; and
        at least one locking device operably coupled to the guide mechanism, wherein the at least one locking device locks rotation of the guide mechanism about the axis in a first direction.

2. The aircraft of claim 1, wherein the guide mechanism is freely movable in a second direction, opposite the first direction.

3. The aircraft of claim 1, wherein the guide mechanism further comprises a roller, the roller being mounted to the airframe for rotation about a roller axis.

4. The aircraft of claim 3, wherein the roller is an elongated cylinder.

5. The aircraft of claim 3, wherein the at least one locking device locks rotation of the roller resulting from deployment of the hoisting cable.

6. The aircraft of claim 3, wherein the roller is rotatable about the roller axis during retraction of the hoisting cable.

7. The aircraft of claim 3, wherein the at least one locking device locks rotation of the roller in a counterclockwise direction.

8. The aircraft of claim 3, wherein the roller is freely rotatable about the roller axis in a clockwise direction.

9. The aircraft of claim 3, wherein the hoisting mechanism is rotatable about an axis to deploy and retract the hoisting cable.

10. The aircraft of claim 9, wherein the roller axis and the axis of the hoisting mechanism are parallel.

11. The aircraft of claim 3, wherein the guide mechanism further comprises an intermediate roller guide including one or more bearing surface arranged in contact with the roller.

12. The aircraft of claim 1, wherein the at least one locking device includes a pawl and ratchet mechanism.

13. The aircraft of claim 1, wherein the at least one locking device is positioned adjacent an end of the guide mechanism.

14. The aircraft of claim 1, wherein when the hoisting cable hangs vertically from the hoisting mechanism, the hoisting cable is not in contact with the guide mechanism.

15. The aircraft of claim 1, wherein the hoisting mechanism is mounted to a position offset from a surface of the airframe of the aircraft.

16. The aircraft of claim 1, wherein the guide mechanism is positioned directly underneath the opening formed in the airframe.

17. The aircraft of claim 1, wherein a length of the guide mechanism is at least equal to a length of the opening formed in the airframe.

* * * * *